April 27, 1971 OSAMU MATSUBARA 3,576,683
TRANSISTOR STRUCTURE WITH THIN, VAPOR-GROWN BASE LAYER
Filed April 4, 1968 4 Sheets-Sheet 1

INVENTOR.
OSAMU MATSUBARA
BY
Lewis H. Eslinger
ATTORNEY

INVENTOR.
OSAMU MATSUBARA
BY
Lewis H. Eslinger
ATTORNEY

INVENTOR.
OSAMU MATSUBARA
BY
Lewis H. Eslinger
ATTORNEY

April 27, 1971 OSAMU MATSUBARA 3,576,683

TRANSISTOR STRUCTURE WITH THIN, VAPOR-GROWN BASE LAYER

Filed April 4, 1968 4 Sheets-Sheet 4

INVENTOR.
OSAMU MATSUBARA

BY

Lewis H. Eslinger
ATTORNEY

United States Patent Office 3,576,683
Patented Apr. 27, 1971

3,576,683
TRANSISTOR STRUCTURE WITH THIN, VAPOR-GROWN BASE LAYER

Osamu Matsubara, Kanagawa-ken, Japan, assignor to Sony Corporation, Tokyo, Japan Filed Apr. 4, 1968, Ser. No. 718,659
Claims priority, application Japan, Apr. 7, 1967, 42/22,214, 42/22,216
Int. Cl. H01l 7/36, 5/00
U.S. Cl. 148—175 8 Claims

ABSTRACT OF THE DISCLOSURE

By this invention are provided new and improved semiconductor devices, and a method of manufacturing the same, in which the base region of the semiconductor device is constituted by an extremely thin, vapor-grown base layer with significantly enhanced current amplification $h_{FE}$, and by a substantially thicker base portion to which an electrical lead may be readily connected, and in which the said semiconductor devices have at least two semiconductor regions thereof formed by the vapor growth technique.

This invention relates to semiconductor devices and to a method of manufacturing the same, and more particularly, to semiconductor devices having base regions which include extremely thin, vapor-grown base portions of excellent performance characteristics, and relatively thick base portions for ease of electrical lead connection.

At present, the diffusion process rather than the vapor-growth technique is generally employed to form the semiconductor device base layer since the use of the latter results in extremely thin base layers which, although providing significantly enhanced current amplification $h_{FE}$, render extremely difficult, if not impossible, the base layer-electrical lead connection. In addition, current methods of semiconductor device manufacture generally provide for the formation of one, only, of the semiconductor regions by use of the vapor growth or epitaxial technique and employ other techniques such as the diffusion technique for the provision of the remaining semiconductor regions.

It is, accordingly, a primary object of this invention to provide semiconductor devices in which the base region is constituted by an extremely thin, vapor grown base layer with high current amplification degree, $h_{FE}$, and by a substantially thicker base region portion to which an electrical lead may be readily connected.

Another object of this invention is to provide semiconductor devices having at least two semiconductor regions thereof formed by the vapor growth technique.

A further object of this invention is to provide a method of manufacturing semiconductor devices as above, which method is simpler, more efficient and less time-consuming than those heretofore employed.

In accordance with the improved method of this invention, a plurality of the semiconductor layers are sequentially formed by the vapor growth technique on a surface of a semiconductor substrate which includes surface-exposed regions of first and second conductivity types. Of particular significance here is the fact that the first formed of these layers is the base layer which, by virtue of the fact that it is formed over the said substrate surface, becomes electrically connected with the substrate region of the same conductivity type thereas to provide a semiconductor device base region which includes both an extremely thin operative base region portion of excellent performance characteristics, and a much thicker base region portion to which an electrical lead may be readily connected.

Briefly described, the significant advantages which flow from the utilization of the vapor growth technique to form at least two semiconductor regions in the manufacture of a semiconductor device are as follows: much greater ease in the control of impurity characteristics and concentrations; sequential vapor growth layer formations in one furnace or a continuous furnace to make the method particularly attractive for use in the mass production of semiconductor devices; significantly reduced manufacturing times; simpler and more accurate control of the thickness of a vapor grown layer and; significant simplification of the steps required in the manufacture of extremely high quality semiconductor devices with high current amplification degree $h_{FE}$ and virtually defectless junctions. These and other significant advantages of the use of the vapor growth technique in the formation of at least two regions of a semiconductor device, and the operating details and characteristics of this technique are described and exemplified in great detail in the copending application of Kinji Hoshi, et al., Ser. No. 708,946, filed Feb. 28, 1968, and assigned to the assignee hereof, whereby the said detailed technique descriptions are hereby incorporated by reference herein.

The above and other objects and advantages of this invention are believed made clear by the following detailed description thereof taken in conjuction with the accompanying drawings wherein.

Figure 1A:
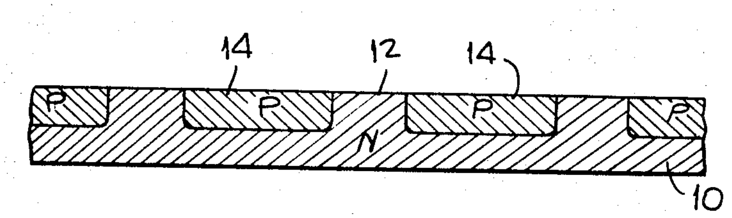
FIGS. 1A through 1G are schematic cross-sectional views showing the steps involved in producing a semiconductor device in accordance with an embodiment of this invention.
Figure 1B:
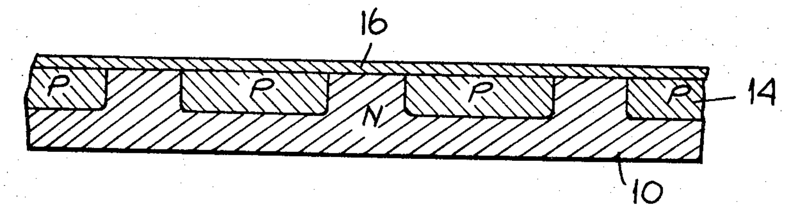
Figure 1C:
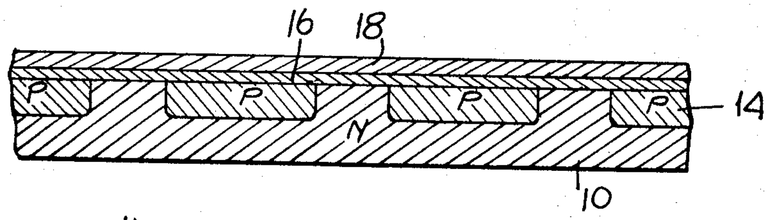
Figure 1D:
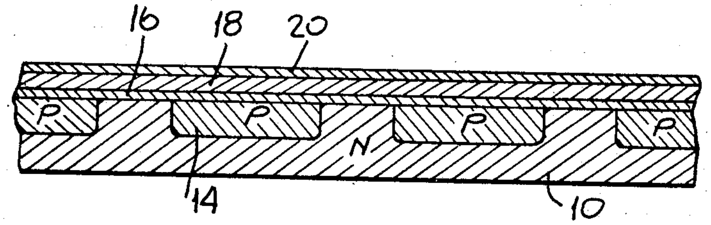

Referring now to FIG. 1A, and commencing with an N-type monocrystalline silicon substrate 10 of by way of example only, approximately 200 microns in thickness, the first step in this method embodiment of my invention would be the selective deposition of an acceptor impurity on the surface 12 of the substrate 10 and the subsequent furnace-heating of the substrate to diffuse the acceptor impurity thereinto to form a plurality of spaced, P-type diffused regions 14 therein. Preferably, the P-type regions 14 have dimensions of approximately 40$\mu$ in depth and approximately 100$\mu$ in width, and are spaced by approximately 20 microns, it being understood of course, that these dimensions may vary quite widely. Then, as illustrated in FIG. 1B, an extremely thin P-type base layer 16 of semiconductive material having a thickness, for example, of approximately 1 to 5$\mu$, is formed by the vapor growth technique on the surface 12 of the substrate. Thereafter, an N-type collector layer 18 of semiconductor material having a thickness, for example, of approximately 5$\mu$, is formed on the base layer 16, as illustrated in FIG. 10, again through the use of the vapor growth technique. Following this, and if desired for lowering the collector resistance of the finished transistor, an N+ type layer 20 of semiconductor material is, as illustrated in FIG. 1D, formed by the vapor growth technique on the collector layer 18. To this effect, the layer 20 of semiconductor material will exhibit a higher impurity concentration and lower resistivity than that of the collector layer 18, whereby the collector resistance of the finished semiconductor device will be decreased as discussed above.

Since each of the semiconductor material layers 16, 18 and 20 are formed by the vapor growth technique, these layer formations can be effected sequentially in the same furnace to result in remarkable simplification of the semiconductor device manufacturing operation with attendant significant reduction in the time required therefor, and absolute elimination of the possibility of contamination of the device by foreign particles in the nature of dust.

Figure 1E:
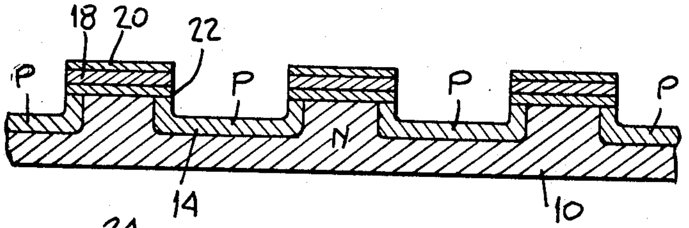

Following the above, the now partially finished semiconductor device is removed from the furnace and, as illustrated in FIG. 1E, grooves or channels 22 are formed, as by etching, in the P-type regions 14. Although, if considered theoretically, it would prove sufficient to extend the grooves 22 only to the outer surface of the P-type regions 14 to re-expose the same, it is, as a practical matter, satisfactory and preferable to extend to said grooves as shown further into the P-type regions 14 because control of the etching speed is extremely difficult. The formulation of the grooves 22 is followed, as illustrated in FIG. 1F, by the vapor growth formation of a collector electrode 24 on the layer 20, a base electrode 26 on the respective bottom surfaces of the grooves 22 and an emitter electrode 28 on the lower surface 30 of the silicon substrate.

Figure 1F:
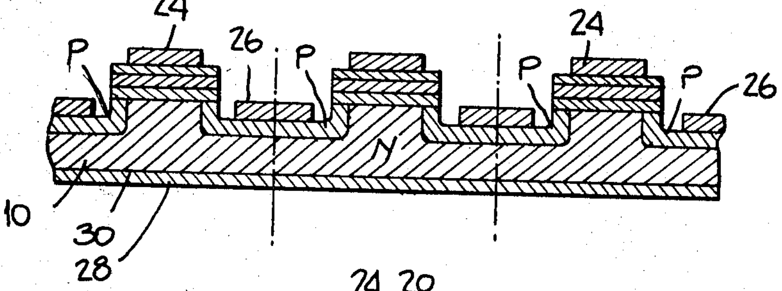
Figure 1G:
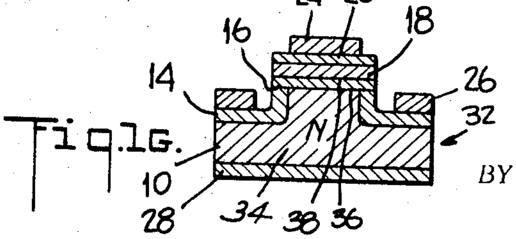

The fabrication of the semiconductor device is then completed by separation, as by cutting, along the dashed lines in FIG. 1F to provide the transistor 32 depicted in FIG. 1G, and by subsequent attachment of the non-illustrated electric leads to the respective transistor electrodes. In the finished transistor 32 of FIG. 10, the remaining region 34 of the mono-crystalline silicon substrate 10 will, of course, function as the transistor emitter region, with the emitter-base junction being identified at 36 and the base-collector junction being identified at 38, and the N± type semiconductor material layer 20 being available to decrease the collector resistance of the transistor 32, as discussed above.

Examination of the transistor 32 of FIG. 1G will reveal the same to comprise a base region which consists of an extremely thin operative base portion formed by the P-type layer 16, and a much thicker base portion formed by the remaining P-type regions 14. Accordingly, there is provided a transistor which offers the combined advantages of greatly enhanced high frequency characteristics such as current amplification degree $h_{FE}$ which result from the relatively thin operative base portion 16, and extreme ease of electrical lead connection which results from the relatively thick base portion as constituted by the P-type regions 14. Although, as described hereinabove, the formulation of the grooves 22 is accomplished from the upper surface 12 of the substrate 10, it is to be understood that the said grooves might, alternatively, be formed from the lower surface 30 of the said substrate. In addition, and with reference to the transistor 32 of FIG. 1G, it is to be understood that the collector layer or region 18 and the emitter 10 are mutually exchangeable, and that the impurity concentration in the region 10 may be increased to increase the emitter carrier injection efficiency.

Figure 2A:
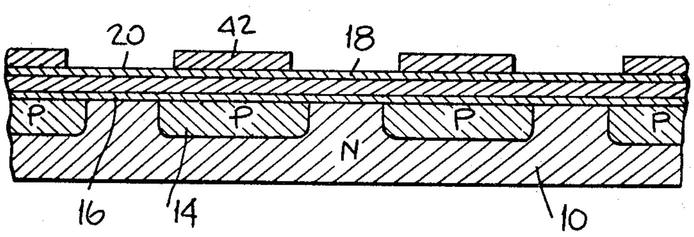
FIGS. 2A through 2C are a series of schematic cross-sectional views showing the steps involved in producing a semiconductor device in accordance with another embodiment of this invention.
Figure 2B:
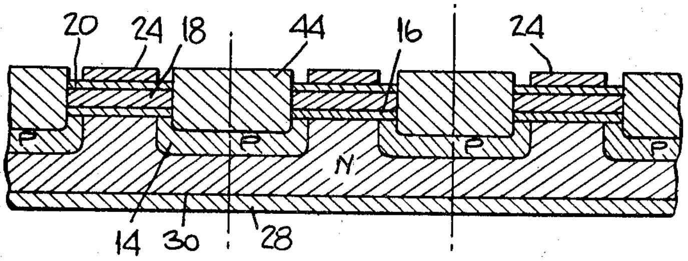
Figure 2C:
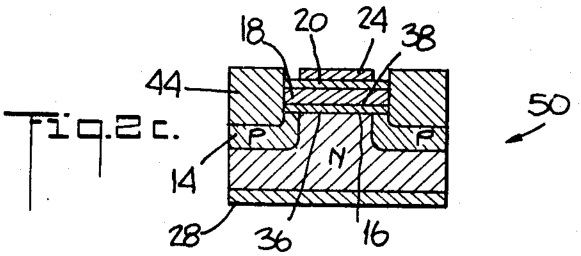

Referring now to the method embodiment illustrated by FIGS. 2A to 2C, it may be noted that this method embodiment commences with the completion of the step illustrated in FIG. 1D. Thus, following the application of the N± type semiconductor material layer 20, as illustrated in FIG. 1D, the method embodiment of FIGS. 2A through 2C would commence with the selective deposition of spaced layers of an impurity metal 42 atop the N± type layer 20. In this instance, the impurity metal 42 is preferably indium, or an indium-gallium alloy which may, for example, take the proportions of nine parts of indium to one part of gallium. Alternatively, if the diffused regions 14 of the substrate 10 were of N-type, rather than P-type, conductivity, the metal of the spaced impurity layers 42 would preferably be antimony. This selective layer deposition would be followed, as illustrated in FIG. 2B, by suitable furnace heating of the monocrystalline silicon substrate 10 to diffuse the impurity metal layers 42 through the semiconductor material layers 16, 18 and 20, respectively, to form alloyed regions 44 which extend as shown into the diffused P-type regions 14 of the substrate 10. Thereafter, and also as illustrated in FIG. 2B, spaced collector electrodes 24 and the emitter electrode 28 are formed by vapor deposition on the surface of the N± type layer 20 and the lower surface 30 of the substrate 10, respectively. In this instance, the protruding portions of the alloyed regions 44 would function as the base electrodes. The fabrication of the transistor 50 of FIG. 2C is then completed by cutting as indicated by the dashed lines in FIG. 2B to again provide a transistor having an extremely thin operative base portion 16 and a much thicker base portion 14 and 44.

Figure 3A:
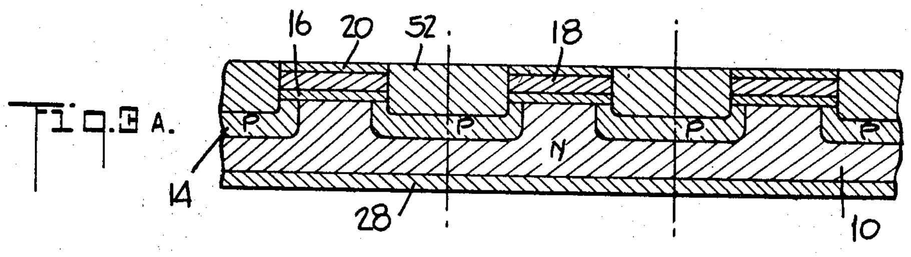
FIGS. 3A through 3C are schematic cross-sectional views illustrating the steps involved in producing a semiconductor device in accordance with another embodiment of this invention.
Figure 3B:
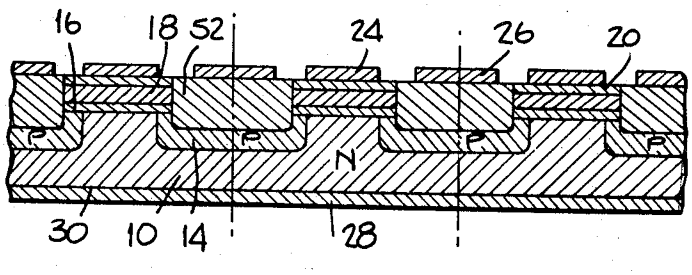
Figure 3C:
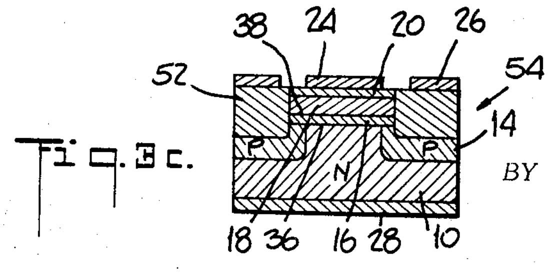

The method embodiment illustrated by FIGS. 3A through 3C includes the steps described hereinabove with reference to FIGS. 1A through 1D. Following this, and as illustrated in FIG. 3A, an impurity metal is selectively deposited on the surface of the N± type layer 20 and the substrate 10 is furnace-heated to diffuse this impurity metal through the respective layers 16, 18 and 20 into the previously diffused P-type region 14 to form alloyed diffusion regions 52 therein and result in the depicted, generally smooth sub-assembly upper surface. Thereafter, as illustrated in FIG. 3B, spaced collector electrodes 24 are vapor deposited on the surface of the N± type layer 20, spaced base electrodes 26 are vapor deposited on the surfaces of the alloyed diffusion regions 52, and the emitter electrode 28 is vapor deposited on the undersurface 30 of the substrate 10. Cutting along the dashed lines of FIG. 3B will then result in the transistor 54 of FIG. 3C, the manufacture of which may then be readily completed by the convenient attachment of the non-illustrated electrical leads to the respective emitter, base and collector electrodes. Again, as with the transistors 32 and 50, the transistor 54 may readily be seen to include an extremely thin operative portion, as provided by base layer 16, and a much thicker base portion, as provided in this instance by the P-type regions 14 and alloyed regions 52.

Figure 4A:
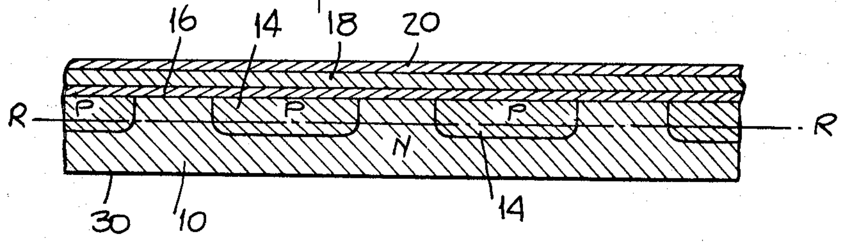
FIGS. 4A through 4C are schematic cross-sectional views illustrating the production of a semiconductor device in accordance with another embodiment of this invention.
Figure 4B:
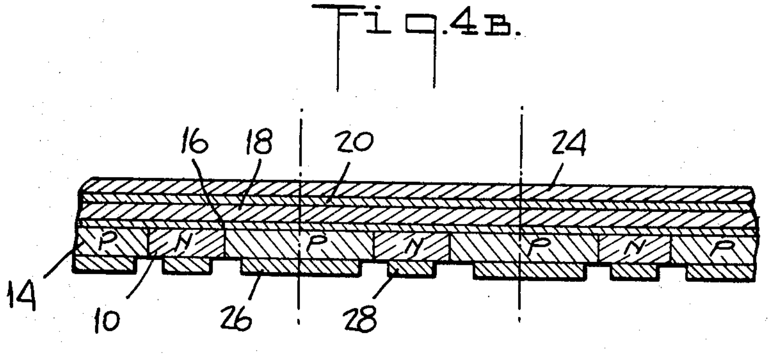
Figure 4C:
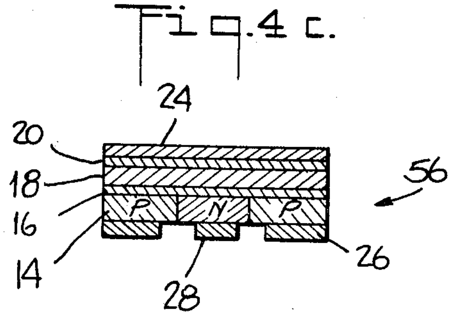

The method embodiment of FIGS. 4A through 4C would also initially comprise the performance of the steps described hereinabove with reference to FIGS. 1A through 1D. Following this, and as illustrated in FIG. 4A, the underside 30 of the substrate 10 would be removed, as by etching and/or cutting or polishing, to the extent indicated by the broken line R—R, thus exposing the under surfaces of the diffused P-type regions 14. Thereafter, as illustrated in FIG. 4B, the collector, base and emitter electrodes 24, 26 and 28, respectively, are formed as shown, as by vapor deposition, and the separation process as described hereinabove effected to form the transistor 56 of FIG. 4C.

The transistor 56 of FIG. 4C may also readily be seen to include a base region which consists of an extremely thin, operative base portion provided by the P-type layer 16, and a much thicker base portion provided by the diffused, P-type region 14, with the same advantages referred to hereinabove regarding significantly improved transistor performance characteristics in combination with greatly enhanced ease of electrical base lead connection. In addition, and referring to each of transistors 32 of FIG. 1G, transistor 50 of FIG. 2C, transistor 54 of FIG. 3C, and transistor 56 of FIG. 4C, it may be noted that, in each instance, the very significant thinning of the operative base region portion is accompanied by considerable lessening of the base spreading resistance, with the latter resulting from the presence of the low resistance, relatively large diffused P-type regions 14 and, in the case of transistors 50 and 54, resulting additionally from the presence of the low resistance, relatively large diffused alloy regions 44 and 52.

Figure 5A:
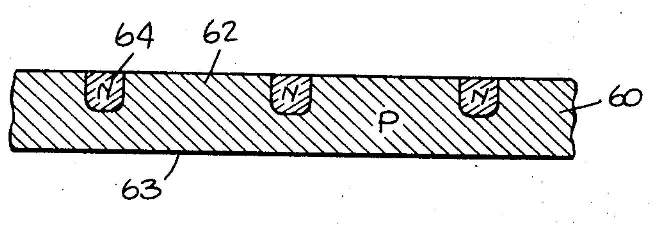
FIGS. 5A through 5G are schematic cross-sectional views illustrating the production of a semiconductor device in accordance with still another embodiment of this invention.
Figure 5B:
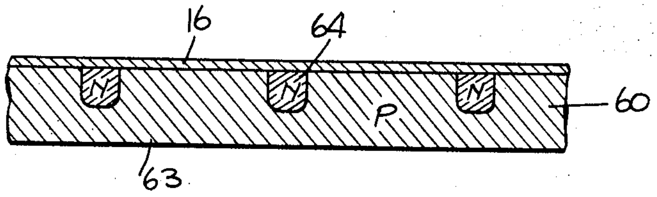
Figure 5C:
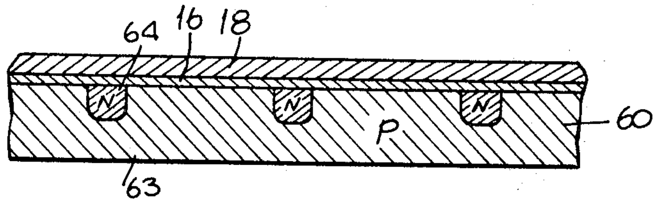
Figure 5D:
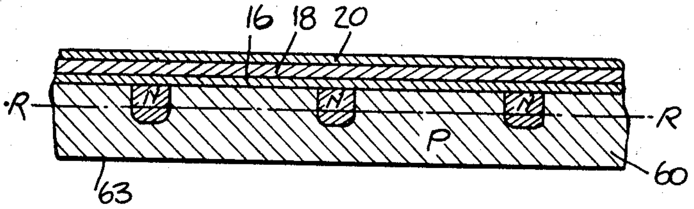
Figure 5E:
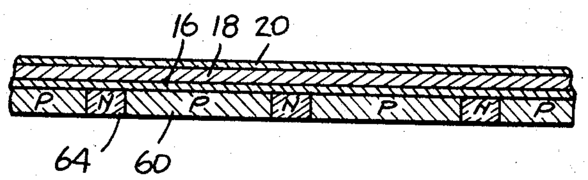

The embodimnt of the new and improved method of my invention illustrated in FIGS. 5A through 5G, differs somewhat from the previously described embodiments through the utilization of a monocrystalline silicon substrate as a connecting area for the base region. Thus, as illustrated in FIG. 5A, this method embodiment commences with the provision of a P-type substrate 60 and the diffusion into the upper surface 62 thereof of a suitable impurity metal to form the N-type diffusion regions 64. Subsequently, and as illustrated in FIGS. 5B and 5C, respectively, a P-type layer 16 of, by way of example, approximately 1 to 5$\mu$ in thickness, a N-type layer 18 of, by way of example, approximately 5$\mu$ in thickness, and a N± type layer 20 are sequentially formed on the upper surface 62 of the substrate 60 by the vapor growth technique. Thereafter, the undersurface of the substrate 60 is removed, as by grinding and/or etching to the extent indicated by the broken line R—R in FIG. 5D to result in the transistor sub-assembly of FIG. 5E.

Figure 5F:
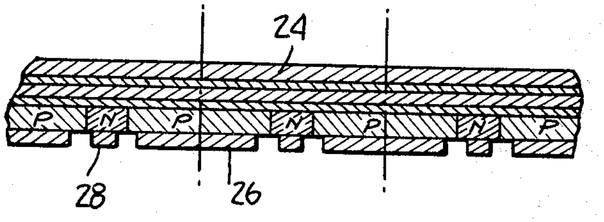
Figure 5G:
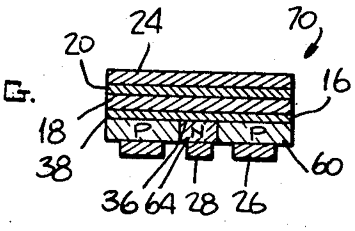

Following this, the respective collector and base electrodes 24 and 26 and the emitter electrode 28 are formed, as by vapor deposition, on opposite sides of the transistor sub-assembly to result in the construction depicted in FIG. 5F. The latter is then cut as indicated by the broken lines to formulate the transistor 70 of FIG. 5G, wherein it may again be noted that, although the remaining P-type regions of the substrate 60 are utilized as the relatively thick base region portion, the transistor 60 does provide, in the manner of the transistors 32, 50, 54 and 56, an extremely thin operative base region portion 16 with improved performance characteristics as discussed above, and the much thicker base region portions 60 for ease of electrical lead connection.

While the present invention has been described in connection with the production of NPN-type transistors, it will be understood that the invention is applicable to other semiconductor devices, such as PNP-type transistors, NIPI-type transistors, integrated circuits, switching devices and so on. Further, it is to be understood that the methods of formation of the semiconductor regions, and the shapes, kinds and dimensions of the semiconductor regions and of the semiconductor substrates are not limited specifically to those described by way of example in the foregoing embodiments, but that they may be modified as desired. Accordingly, it is believed apparent that many modifications and variations other than those specifically noted above may be effected in the described embodiments without departing from the scope or spirit of this invention as defined in the appended claims.

What is claimed is:

1. In a method of manufacturing a semiconductor device starting with a semiconductor substrate of one conductivity type, the steps of diffusing into a discrete area of one surface of said substrate an impurity adapted to provide a respective diffused region of conductivity type opposite to that of said substrate, whereby to provide said substrate with regions of first and second conductivity types which are exposed at respective areas of said one surface, vapor growing over both of said exposed areas of said one surface a thin base layer of said first conductivity type and of substantially smaller thickness than said first conductivity type region of said substrate, whereby said thin base layer is connected to said substrate region of said first conductivity type and extends over said region of said second conductivity type to provide an operative base portion of excellent performance characteristics which, with said substrate region of said second conductivity type, defines a first semiconductor junction therebetween, and said substrate region of said first conductivity type provides a further relatively thick base portion, vapor growing a layer of semiconductor material of said second conductivity type over said base layer to provide a second semiconductor junction therebetween, forming a base electrode in electrical contact with said relatively thick base portion, and forming additional electrodes in electrical contact with said substrate region of said second conductivity type and with said layer of semiconductor material of said second conductivity type, respectively.

2. In a method as in claim 1, further comprising, the steps of, forming, by said vapor growth technique, a second layer of said second conductivity type over the previously formed second conductivity type layer, said second layer being of a semiconductor material which exhibits higher impurity concentration and lower resistivity than said previously formed layer whereby, the overall resistance of said second conductivity type layers is decreased.

3. In a method as in claim 1 wherein, said first conductivity type substrate region is of approximately 40$\mu$ in thickness, and said first conductivity type layer is formed to have a thickness ranging from approximately 1$\mu$ to approximately 5$\mu$.

4. In a method as in claim 1, the further steps of forming grooves through said base layer and said layer of said second conductivity type to re-expose surface areas of said substrate region of said first conductivity type, and in which said base electrode is formed on said re-exposed surface areas.

5. In a method as in claim 4 wherein said grooves are formed to extend into said first conductivity type substrate regions.

6. In a method as in claim 1, the further steps of diffusing an impurity metal through said layers into said substrate region of said first conductivity type to form an alloyed region constituting the electrical contact of said base electrode with said relatively thick base portion.

7. In a method as in claim 1 wherein, the surface of said substrate remote from the substrate surface upon which said base layer is formed, is constituted entirely by said second conductivity type substrate region, and said method further comprises, the steps of, removal of sufficient of said substrate from said remote surface thereof to expose remote surface areas of said first conductivity type regions.

8. In a method as in claim 1 wherein, the surface of said substrate remote from the surface upon which said base layer is formed, is constituted entirely by said first conductivity type substrate regions, and said method further comprises, the steps of, removing sufficient of said substrate from said remote surface to expose remote surface areas of said second conductivity type substrate regions.

References Cited

UNITED STATES PATENTS

| | | | |
|---|---|---|---|
| 3,194,699 | 7/1965 | White | 148—187X |
| 3,210,225 | 10/1965 | Brixey | 148—187 |
| 3,220,896 | 11/1965 | Miller | 148—175X |
| 3,309,241 | 3/1967 | Dickson | 148—177X |
| 3,332,143 | 7/1967 | Gentry | 148—175X |
| 3,341,377 | 9/1967 | Wacker | 148—177 |
| 3,370,995 | 2/1968 | Lowery et al. | 148—175 |
| 3,372,063 | 3/1968 | Suzuki | 148—1.5 |
| 3,423,255 | 1/1969 | Joyce | 148—175 |
| 3,178,798 | 4/1965 | Marinace | 29—25.3 |
| 3,184,657 | 5/1965 | Moore | 317—234 |
| 3,305,913 | 2/1967 | Lovo | 29—25.3 |
| 3,384,793 | 5/1968 | Moriyama et al. | 317—235 |

L. DEWAYNE RUTLEDGE, Primary Examiner

W. G. SABA, Assistant Examiner

U.S. Cl. X.R.

29—591; 117—212; 148—177, 187; 317—235